Feb. 20, 1934.  P. S. NISSON  1,948,126
REFINING APPARATUS
Filed Jan. 21, 1929
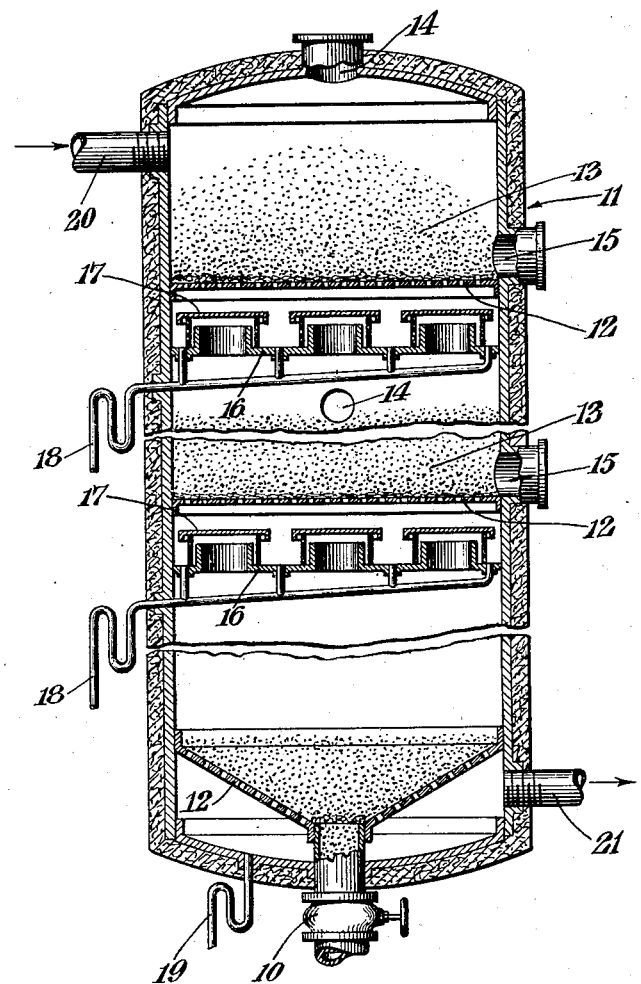

Patented Feb. 20, 1934

1,948,126

UNITED STATES PATENT OFFICE 1,948,126

REFINING APPARATUS

Philip S. Nisson, Brooklyn, N. Y., assignor to The Gray Processes Corporation, Newark, N. J., a corporation of Delaware Application January 21, 1929. Serial No. 333,804

4 Claims. (Cl. 196—96)

This invention relates to petroleum refining and pertains especially to the purifying of cracked hydrocarbons by contacting the same in vapor phase with solid adsorptive treating material.

When cracked hydrocarbon vapors are passed through solid adsorptive treating material, the most common example of which in commercial use is fuller's earth, the unstable, unsaturated constituents such as diolefins and the like present therein are polymerized into compounds of higher boiling points which compounds liquefy and are thereby separable from the vapor. This is taken advantage of in the refining process disclosed in U. S. Patent No. 1,340,889, and in various improvements of such process. In general these processes are practiced by connecting a treating tower containing solid adsorptive treating material to a distillation system which may be a cracking, a re-running or a topping system, and the hydrocarbons to be treated are passed in vapor phase through the treating material until the latter is spent as evidenced by the lack of refinement of the treated vapor. Polymers formed in the process are separated from the treated vapors by virtue of their higher boiling point. It is preferable to pass the vapor downwardly through the catalyst, although upward treatment gives satisfactory results.

The co-pending application of T. T. Gray, Ser. No. 291,597, filed July 10, 1928, discloses and claims an improvement on the above process which results in a product of superior quality as regards freedom from gum forming constituents, color, stability and the like, and also in a higher ratio of hydrocarbons treated to catalyst used. It also provides for more efficient separation of polymers from the treated vapors and more convenient means of continuous operation than hitherto have been available.

The present invention has for an object a treating apparatus for practicing efficiently the process above referred to.

A better understanding of the novel features of this invention will be facilitated by a description of the manner in which the catalyst becomes spent in the process as heretofore carried on, particularly where the vapors are passed downwardly through the treating material. It is apparent that in such process the least refined vapors come first in contact with the material near the top of the treating tower and successively lower layers are subjected to progressively more refined vapors. In this way the upper strata of the treating material becomes spent before the lower ones. However, in actual operation it has been found that it is the lower layers and not the upper which first becomes so saturated with polymers as to prevent them having a beneficial effect on the vapors. Apparently this is caused by the wetting of the lower portions of the catalyst by polymers produced in the upper portion and carried down by the combined action of gravity and the vapor stream. Moreover when the vapors are passed downwardly through the treating material they come in contact finally with the material most fully saturated with polymers and the difficulty of completely separating the treated vapor and polymers is increased and the quality of the treated vapor may actually be lessened by being passed through the bottom layers.

According to the present invention the above noted undesirable features are eliminated by utilizing a plurality of beds of treating material instead of using, as heretofore, a single bed. The polymers formed in each bed or treating zone are removed from the vapor stream before the latter passes on to the next treating bed or zone. Polymers formed in one zone are thus prevented from wetting the treating material in successive zones and the effective life of the latter is materially increased; each treating bed or zone is maintained uncontaminated by polymers from the preceding stages.

Other objects, novel features and advantages of this invention will be apparent from the following description and accompanying drawing, wherein:

The figure discloses (partly in section) an apparatus embodying the invention.

In the drawing 11 is an insulated treating tower provided with a plurality of perforated shelves 12, the bottom one of which terminates in a discharge spout controlled by a suitable valve 10. Upon each of the shelves there is supported a bed of treating material 13, preferably fuller's earth. Manholes 14 are provided for charging the treating material onto the shelves 12 and manholes 15 are provided for removing the spent treating material from the upper shelves, the treating material being removed from the lower shelf through its discharge spout. The tower is provided with a plurality of horizontal partitions 16, there being such a partition arranged beneath each of the upper shelves 12. These partitions are provided with shielded apertures 17 through which treated vapors may pass. Each shielded aperture consists of an upturned spout over which there is a loosely fitting cap. This cap is very similar to a bubble cap and may have holes near the bottom of the side or the bottom may be kept off the floor by prongs. Trapped pipes 18 are provided for removing liquefied polymers and other liquid draining through the shelves 12 onto the partitions 16. The cap over the spout prevents liquid from passing through the spout and deflects that liquid to the floor of 16 where it is drained by 18. A trapped outlet 19 is also provided for removing liquid from the lower portion of the tower. Vapor is admitted to the upper part of the tower through the inlet 20 and is discharged from the bottom of the tower through the outlet 21. The shelves 12 are permeable to vapor and liquid but are impermeable to solids.

The operation of this apparatus is as follows: Vapor to be treated is admitted through the inlet 20 and passed downwardly through successive beds of treating material by way of the apertures 17 in the shelves 12, thereby effecting polymerization of the unstable unsaturated constituents of the vapor by contact with the treating material. By means of the partitions 16 the polymers formed and the condensate produced in each layer of treating material are prevented from passing onto the subsequent layers, thereby preventing contamination of the latter while the vapor passes freely through the openings 17. The pipes 18 keep the partitions 16 free of liquid so that there is no tendency for the vapors to carry over entrained liquid. Treated vapors are removed through the outlet 21 and may be passed through a separator (not shown) completely to remove any liquid and polymers and are then carried over to the condenser.

By use of the apparatus above described the polymers formed in one treating zone are prevented from contaminating the treating material in a subsequent zone. The life of the treating material is thus increased and a better product is obtained. The number of treating zones used may be varied as desired to meet different conditions. Preferably fuller's earth is used as the treating material but other solid adsorptive catalytic material may be used, such for example as bauxite.

It is of course understood that the shelves for supporting the catalytic material may be of different number according to the conditions and the vapors may be made to pass upwardly through the beds of catalytic material as well as downwardly. It is obvious that other changes may be made in the structure of this apparatus without in any way departing from the spirit of the invention as defined in the appended claims.

I claim:

1. An apparatus for treating vapors comprising a tower, a plurality of partitions forming superposed chambers, a fluid permeable support in each chamber for a bed of solid treating material, means for passing vapor successively through said chambers and trapped draw-off pipes having a plurality of drainage inlets depending from the partitions forming the bottoms of said chambers.

2. An apparatus for treating vapors comprising a tower, a plurality of partitions forming superposed chambers, a fluid permeable support in each chamber for a bed of solid treating material, means for passing vapor downwardly through successive chambers, and trapped draw-off pipes having a plurality of drainage inlets depending from the partitions forming the bottoms of said chambers.

3. An apparatus for treating vapors comprising a shell, a plurality of partitions forming superposed chambers, a fluid permeable support in each chamber for a bed of solid treating material, upwardly flanged shielded apertures in each partition for permitting passage of vapor while preventing passage of liquid, trapped draw-off pipes having a plurality of drainage inlets depending from the partitions forming the bottoms of said chambers, a vapor inlet, and a vapor outlet.

4. An apparatus for treating vapors comprising a shell, a plurality of partitions forming superposed chambers, a fluid permeable support in each chamber for a bed of solid treating material, upwardly flanged shielded apertures in each partition for permitting passage of vapor while preventing passage of liquid, trapped draw-off pipes having a plurality of drainage inlets depending from the partitions forming the bottoms of said chambers, a vapor inlet leading into the top chamber, and a vapor outlet leading from the bottom chamber.

PHILIP S. NISSON.